(No Model.)
D. W. LEEDY.
ANIMAL TRAP.
No. 538,972.  Patented May 7, 1895.
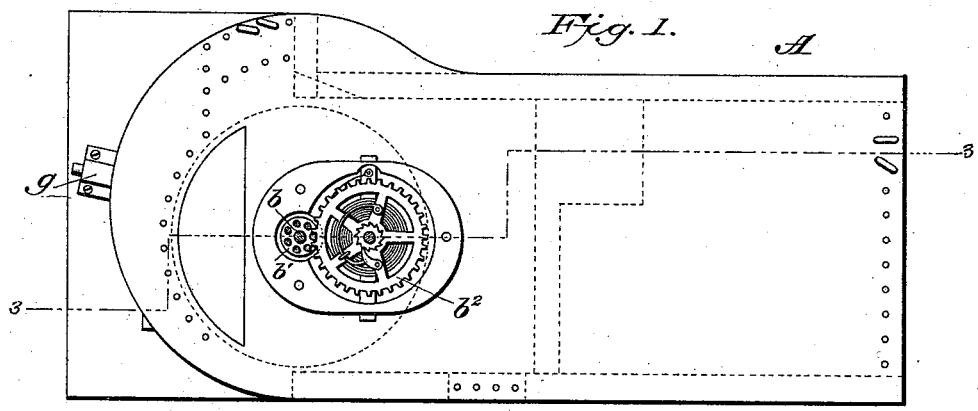
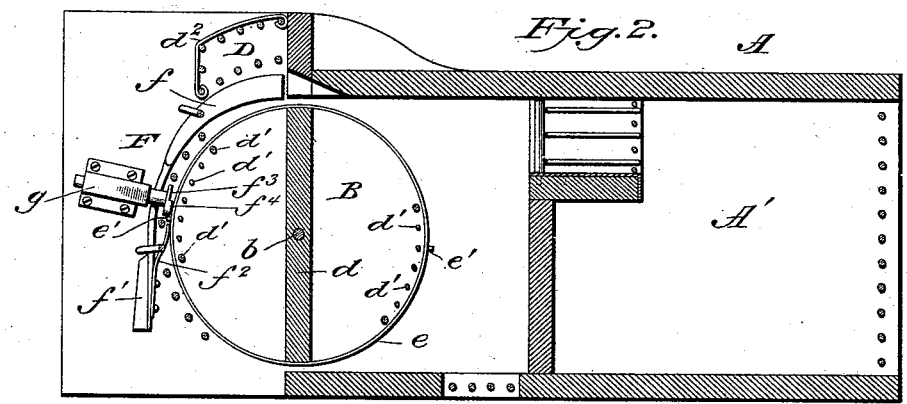
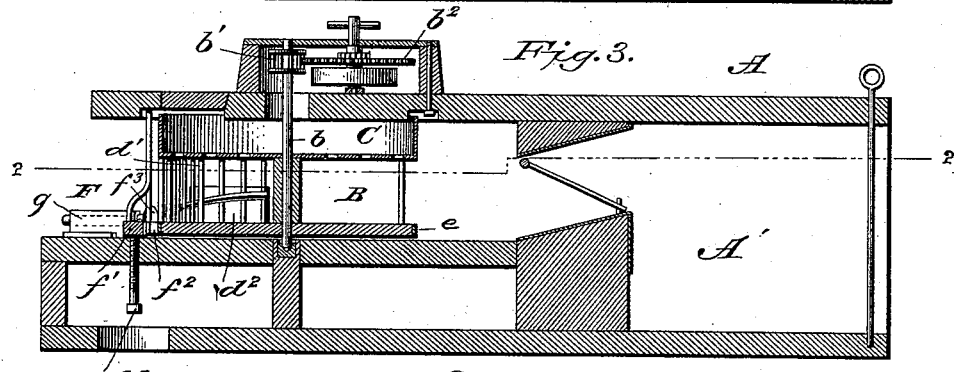
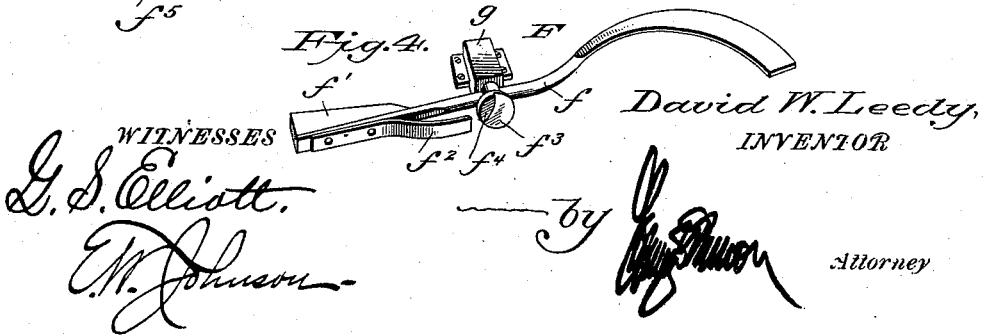
WITNESSES
G. S. Elliott
E. W. Johnson
David W. Leedy,
INVENTOR
by [signature]
Attorney

UNITED STATES PATENT OFFICE.

DAVID W. LEEDY, OF LIMA, OHIO.

ANIMAL-TRAP.

SPECIFICATION forming part of Letters Patent No. 538,972, dated May 7, 1895.

Application filed February 28, 1895. Serial No. 540,035. (No model.)

*To all whom it may concern:*

Be it known that I, DAVID W. LEEDY, a citizen of the United States of America, residing at Lima, in the county of Allen and State of Ohio, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in animal traps; and it consists in the special construction and combination of the parts wherein is embodied an improved releasing device for a spring-actuated rotatable cage, as well as specially constructed bait compartments and chambers for the captured animal; all as will be hereinafter fully described.

In the accompanying drawings, forming part of this specification, Figure 1 is a plan view of a trap constructed in accordance with my invention, the top of the compartment which incloses the cage-rotating mechanism being removed. Fig. 2 is a horizontal sectional view on the line 2 2 of Fig. 3. Fig. 3 is a vertical sectional view on the line 3 3 of Fig. 1, and Fig. 4 is a detail perspective view of the mechanism for holding and releasing the rotatable cage.

A designates a frame which is suitably constructed to provide at one end a chamber A'. At the other end of the frame is journaled a rotatable cage B which is mounted on a shaft *b* provided at its upper end with a lantern-wheel or pinion *b'* which meshes with a gear-wheel *b²* mounted on a shaft to which is attached one end of a spring, the other end of said spring being suitably secured. The spring-actuated shaft and gear-wheel carry a pawl and ratchet, and through the shaft passes a bar which forms a convenient means for winding the spring. This driving mechanism is incased within a housing secured to the top of the frame A.

The rotatable cage B is provided at its upper portion with a bait receptacle C having a perforated bottom, the top of the frame A forming the top of this bait receptacle and having an opening through which the bait is passed, said opening being covered by a lid as shown. The rotatable cage has a vertical partition *d* and at opposite sides is provided with vertical wires *d'*, the wires being so located as to present open spaces adjoining the partition on both sides, as shown more clearly in Fig. 2.

The frame A is provided to one side of the rotatable cage with a bait compartment D made up of a series of vertical wires two or more of which are removable for the purpose of placing bait in said compartment, the lower ends of the outer series of wires being covered by a plate *d²*.

The outer edge of the floor of the cage is provided with a band of metal *e*, and at diametrically opposite points project pins or stops *e'*, the pins being properly positioned with respect to the partition so that when they are in engagement with the detent hereinafter described there will be a passageway on one side of the partition directly to the bait-chamber D, the other side of the cage being in position to communicate with a space which leads to the chamber A' by way of an opening having a gravity-door.

F designates the releasing device or detent mechanism which consists of a bar *f* one end of which is curved and flattened to lie between the bait chamber and rotatable cage, the other end being provided with a counter-balancing weight *f'* and spring *f²*, the spring bearing against the metal band *e* of the cage. The bar *f* is provided with a stem or journal which fits in the bearing box *g* and has on its inner end a disk *f³*, the major portion of the face of the disk being cut away to present a projection *f⁴* both edges of which are curved, and against the lower portion of this projection the pins or stops *e'* abut when the bar or lever *f* is in its normal position with the weighted end down, the projection moving out of the path of the pin or stop when the other end of the lever is depressed. An adjusting screw *f⁵* is passed through the upper floor of the frame A for limiting the downward movement of the bar or lever *f*, and by means of this screw the detent mechanism can be adjusted to different degrees of sensitiveness.

It will be noted that the construction of the frame A is such that the place where the animal enters the trap is considerably above the base of the frame. This is desirable in traps which are designed to be used in granaries as it will position the mechanism above the floor and avoid the liability of having the detent mechanism choked by grain.

It will be noted that the spring $f^2$ bears at all times upon the metal band and thus provides a retarding means for the rotatable cage, and will also prevent backward rotation of the cage as the end of the spring is on the other side of the pin or stop from the projection $f^4$.

In operation, after the trap is baited and set the animal enters the rotatable cage on one side of the partition and in attempting to get at the bait in the chamber D depresses the end of the bar or lever $f$ which will move the projection $f^4$ out of engagement with the pin or stop $e'$ thus releasing the cage so that it will make a half revolution, being stopped by the other pin. The animal in trying to escape will pass through the trap-door into the chamber A'. When the detent mechanism is released the lever will return automatically to its normal position by reason of the weighted end, and the next pin will first strike against the spring and retard the rotation of the cage before said pin reaches the projection $f^4$.

The device hereinbefore described is not liable to get out of order and forms an efficient trap.

Having thus described my invention, what I claim as new, and desire to secure by Letters Patent, is—

1. In an animal trap, the combination, of a rotatable cage having projecting pins, a detent mechanism consisting of a bar or lever bent at one end to lie adjacent to the periphery of the rotatable cage and weighted at its other end, the bar or lever having a projection which is adapted to be moved in and out of the path of the projecting pins on the rotatable cage.

2. In an animal trap having a rotatable cage and projecting pins, $e'$, of a detent mechanism adapted to be operated by an animal in the cage and consisting of a pivoted bar or lever having a projection to one side of the center of the pivot with which the pins are adapted to engage, and a spring carried by the normally lower end of the bar or lever, said spring being adapted to bear upon the periphery of the rotatable cage in the path of the pins, substantially as set forth.

3. In an animal trap, the combination with a spring-actuated rotatable cage, of a bait compartment D located adjacent thereto, the rotatable cage having a bottom with a metal band and projecting pins, of a detent mechanism consisting of a pivoted bar or lever having one end bent and flattened to lie between the bait chamber and rotatable cage, the other end being weighted and provided with a spring, the center portion of the bar or lever to one side of its fulcrum having a projection $f^4$ with which the pins carried by the rotatable cage engage when the weighted end of the pivoted bar or lever is lowered, substantially as set forth.

4. In combination with an animal trap having a frame constructed substantially as shown and having compartments, of a spring-actuated rotatable cage having projecting pins which lie in the path of the detent mechanism, the detent mechanism comprising a pivoted bar or lever weighted at one end the other end being shaped to lie between the rotatable cage and the bait chamber D, together with an adjusting screw $f^5$ carried by the frame to provide means for limiting the downward movement of the bar or lever $f$, substantially as shown and for the purpose set forth.

In testimony whereof I affix my signature in presence of two witnesses.

DAVID W. LEEDY.

Witnesses:
  S. C. REED,
  J. B. YOUNG.